Dec. 13, 1949  S. SOBILO  2,491,339
MAGNETIC SINE BAR
Filed Sept. 26, 1944  3 Sheets-Sheet 1

Inventor
Stanley Sobilo.

By Clarence A. O'Brien
and Harvey B. Jacobson
Attorneys

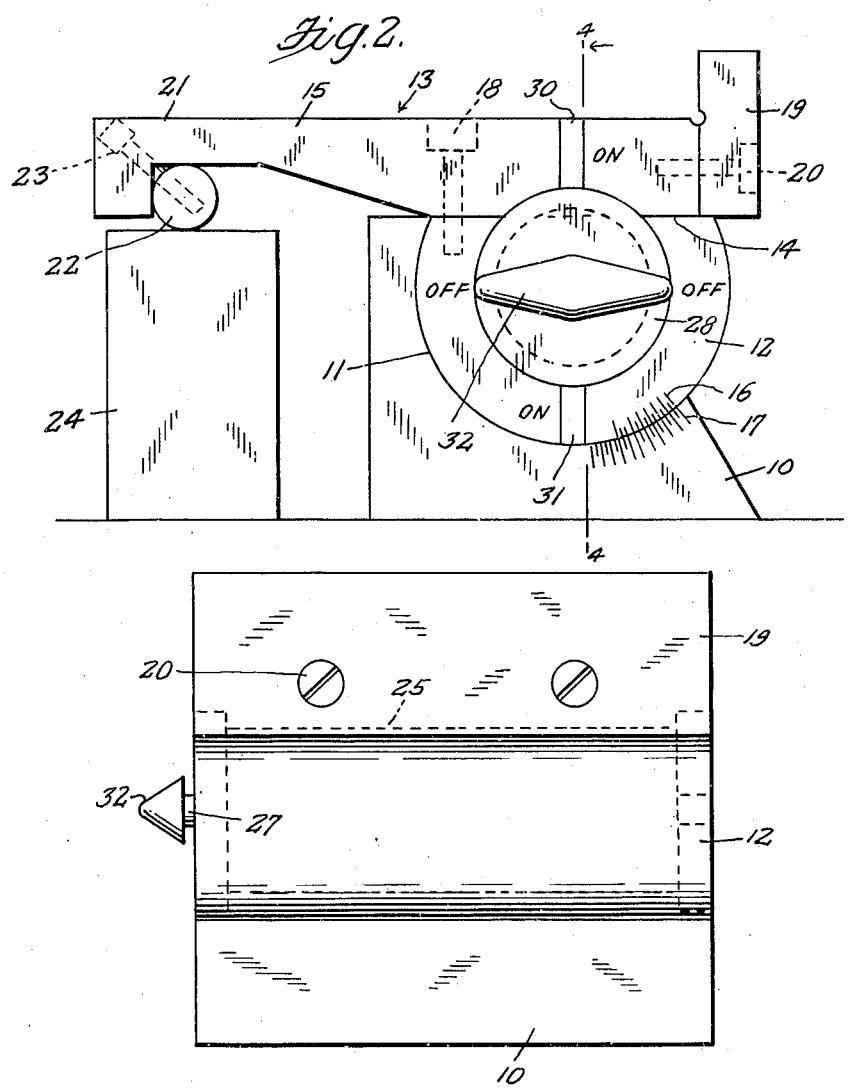

Dec. 13, 1949 S. SOBILO 2,491,339
MAGNETIC SINE BAR
Filed Sept. 26, 1944 3 Sheets-Sheet 3

Inventor
Stanley Sobilo.

By Clarence A. O'Brien
and Harvey B. Jacobson
Attorneys

Patented Dec. 13, 1949

2,491,339

UNITED STATES PATENT OFFICE 2,491,339

MAGNETIC SINE BAR

Stanley Sobilo, Hammond, Ind.

Application September 26, 1944, Serial No. 555,867

8 Claims. (Cl. 33—174)

This invention relates to sine bars provided with sine tables holding work pieces for grinding, honing, lapping or for any kind of machining at certain prescribed angles or for checking gauges such as tapered plug gauges, tapered thread gauges, countersink gauges or the like, or for working on the work piece flat surfaces, holes, bevels or chamfers, which are in an inclined position with respect to the base.

It has been customary heretofore to make a set up for performing one of the operations above mentioned by means of at least three tools, such as an angle plate, a sine bar, and a clamp. Moreover, gauge blocks or the like have to be used. The rather intricate operation to be performed with these tools need not be described in detail. It is sufficient to state that both hands have to be used and that even with a skilled operator only in one case out of about 15 to 20 cases is it possible to arrange the set-up properly at the first trial. It will, therefore, be understood that much time and effort has to be spent for this type of work especially if a high precision has to be obtained or if the work piece has to conform to scientific standards.

It is the general object of the invention to provide a tool which performs exactly the functions which the known tools have performed but which also replaces the plurality of tools hitherto used by one single tool and which reduces to a very notable degree the work to be performed by the operator. It is especially one part of the general object of the invention to free the operator's hands so that he can handle the tool and the work piece simultaneously and to relieve him of all complicated and insecure operations liable to disturb the set-up already made. It is a further part of the general object to secure a simple and straight forward operation without loss of time and effort due to the disturbance of the result of prior steps already performed by steps performed later.

It is a further and important object of the invention to provide a tool permitting fixation of the work piece with respect to the table or holding plate on which it is held simultaneously with the fixation of the members of the tool in any position which may be required by a single magnetic means using permanent magnets only.

It is a further object of the invention to provide means permitting precision adjustment of the angle to which the sine table or holding plate or bar has been moved.

It is a further object of the invention to provide means to adjust the magnetic flux with respect to the members or pieces to be held so as to be able to increase or decrease the force with which they are held, thus facilitating removal and manipulation in general.

It is a still further object of the invention to provide means for performing the adjustment of the magnetic force acting on the work piece or on the members which have been angularly adjusted which will not disturb the results of steps previously performed.

A number of other objects and of advantages obtained with the present invention will appear in the course of the following description of one modification of the invention.

The invention, as will be understood, resides in the improved construction and arrangement of the tool provided with sine bar or sine table as well as in the combination and special arrangement of the parts. It is to be understood, however, that the fact that only one modification of the invention is shown and described is not intended to be limitative, the illustration and description of one preferred embodiment being deemed sufficient to disclose the invention to persons skilled in the art to which it appertains. The novelty of certain constructions, arrangements and combinations is pointed out in the claims and it will be obvious to those skilled in the art that these novel features may be realized even when some of the details of the construction, the arrangement or combination of parts is changed or varied.

The invention is illustrated in the accompanying drawings in which:

Figure 2 is an elevational side view of the same, showing a gauge block which is a separate piece but forms part of the entire tool set-up.

Figure 3 is an elevational rear view of the tool.

Figure 1:
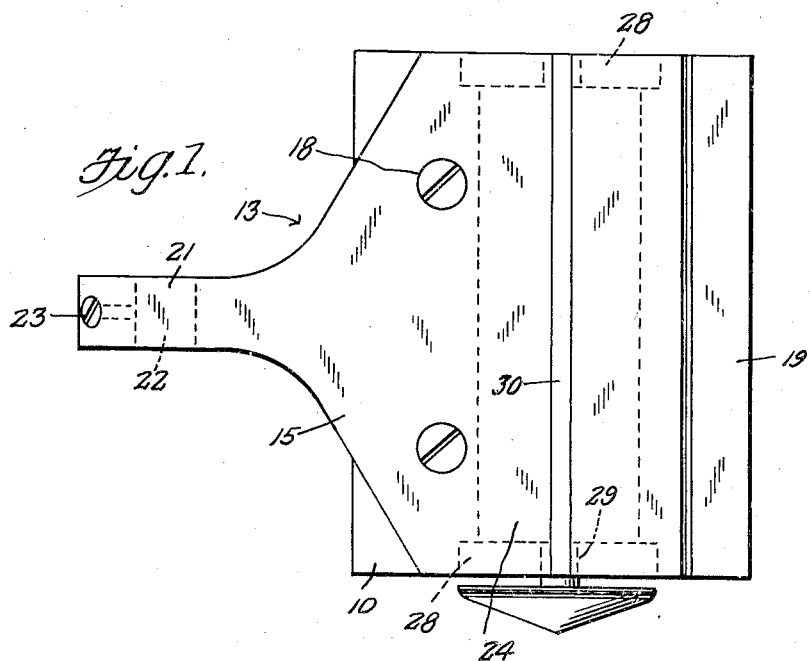
Figure 1 is a plan view of a combined angle plate and sine bar tool, which will hereinafter merely be called sine bar.
Figure 4:
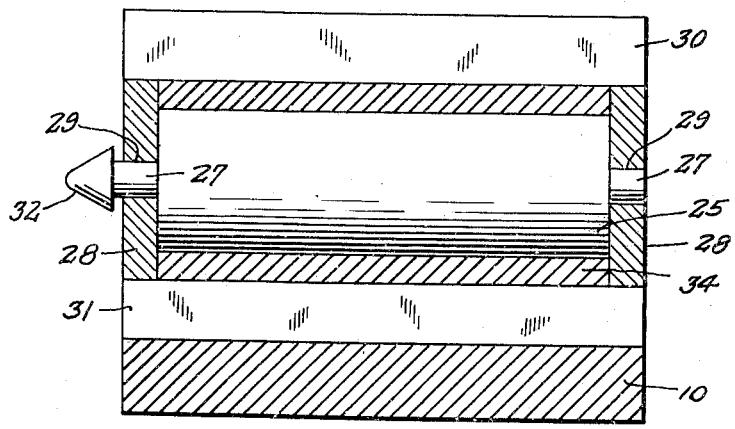
Figure 4 is a vertical cross-section along the line 4—4 of Figure 2 which passes through the swivel of the sine bar.

The tool consists of a base member 10 with a cylindrical concave or hollow surface 11 covering an angle less than 180 degrees which forms the support for a swivel 12 of the sine bar generally designated by 13.

The swivel 12 is a large hollow cylinder or roller the upper part of which has been cut away so that a flat surface 14 results which is fixed to the sine table 15 holding the work piece by means of screws 18. The hollow interior 34 of the swivel 12 houses a magnet 25 in a manner to be described.

On the front of the swivel a vernier scale 16 is arranged which cooperates with an angular graduation scale 17 on the base member 10 and permits precise angular adjustment of the sine bar 13 with respect to the base member 10.

The sine table 15 is provided with a cross piece 19 at its rear projecting upwardly from the table and fixed to it by screws 20.

The sine table 15 may simply be of rectangular shape or may have any other appropriate shape consistent with the work to be done. On account of its weight which is, as a rule, very large, its shape is preferably so selected that the rectangular part covers only the minimum area which is necessary for holding the work pieces. As a rule, where large swivel rollers, as large as those shown in the drawings, are employed, this minimum area is not much larger than the cut surface of the swivel roller and in this case the foremost part of the sine table is reduced to an arm 21 holding the sine roller 22, which is fixed to it by means of screws 23.

The sine roller 22, as well known, is arranged at a fixed distance, usually 3 inches or 5 inches, from the axis of the swivel in order to have a predetermined relation to the angle which may be expressed in definite lengths. The sine (or cosine) of the angle may thus be measured at this point.

The basic or horizontal position of the sine bar 13 is fixed by a gauge block 24 on which the sine roller 22 may rest. Whenever in this position of rest the upper surface of the table 15 is strictly horizontal and strictly parallel to the surface on which the sine bar rests. This position may also find its expression in the vernier arrangement which is then in its zero position.

Figures 5, 6:
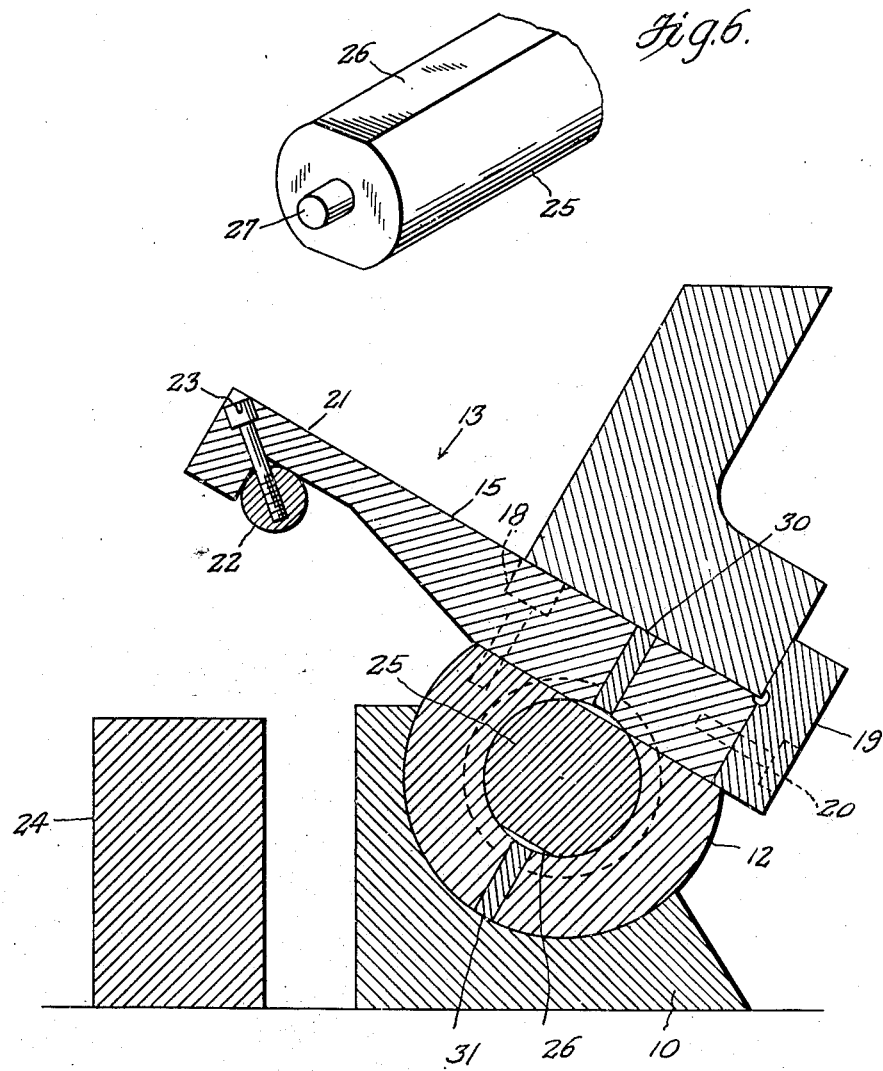
Figure 5 is an elevational longitudinal cross section through the tool with the table in an inclined position and with a work piece held on the said table.
Figure 6 is a perspective view of the magnet.

The magnet 25 is of cylindrical shape but is flattened at two diametrically opposite sides as shown at 26 in Figure 6. It fills the cylindrical opening 34 of the swivel 12. The magnet 25 is preferably made of the well known alloy with a high cobalt content which on account of the special magnetic properties of this metal, is used, as well known in the art, for constructing strong permanent magnets. It is magnetized in a transverse direction with the poles in a position intermediate between the flattened surfaces.

From the magnet 25 short stub axles 27 are projecting by means of which the magnet is journaled so that it can be rotated within the swivel 12.

The swivel 12 and the sine table 15 as well as the base member 10 are made of cold rolled steel, a metal which is permeable, as well known.

The magnet is held in the swivel 12 by circular brass disks 28 inserted into the ends of the cylindrical opening 34 of the swivel and these disks have central bores 29 within which the stub axles 27 of the magnet 25 are journaled. The brass disks 28 are of high reluctivity and, therefore, present a sufficient resistance to magnetic lines of force to prevent the formation of a field starting at the front end of the magnet which is closed through the swivel.

In the swivel 12 and in the sine table 15 transverse brass flux directive strips 30, 31 of high reluctivity have been inserted transecting both of these members and dividing them into two magnetically separate parts.

It will be remembered that the swivel consists of a hollow roller whose top part has been cut away. The cylindrical magnet 25, therefore, is not surrounded by the cylindrical swivel roller at its top part but a portion of the sine table 15 overlies the magnet. The flux directive brass strip 30 is located in a radial plane passing through the axis of the magnet and at right angles to the sine table. It subdivides the table 15 completely and forms a major resistance for the passage of magnetic lines of force. When a steel work piece is fastened to the sine table the lines of force entering the sine table are therefore directed outwardly and are forced to pass through the work piece.

Similarly the swivel is subdivided below the magnet 25 by a flux directive brass strip 31 arranged in a radial plane in a position which is diametrically opposite to the position of the brass strip 30.

On one or both of the stub axles 27 protruding through the brass disks 28, a handle 32 is fixed which permits to rotate the magnet 25 and the turning of the flattened surfaces of the cylindrical magnet from which the concentrated magnetic flux issues either toward the work piece and base member or away from it.

The operation of the device is extremely simple. The sine bar has to be brought to the required angular position, either by using the vernier or by using the sine roller. The movement of the sine table on the base member is extremely precise when the parts have been adjusted with precision, partly on account of the large dimension of the swivel.

When the work starts the magnet is in its off-position which is a position in which the flat surfaces 26 of the cylindrical magnet 25 are not facing the brass strips but are in the position shown in Figure 2. The work piece is now brought into its proper position on the sine table, preferably with one of its faces abutting against the rear plate 19 (Figure 5) and when the work piece is in its proper position the magnet is turned by means of the handle 32 so that the flat faces 26 face the brass bars 30, 31. The magnetic field is thus forced to close through the work piece which is, therefore, held firmly on the table 15 by magnetic force.

At the same time a similar magnetic field is forced outwardly at the lower surface 26 of the magnet. By virtue of the brass bar 31 the field is forced to traverse the base member 10 and the swivel 12 is thus held against the base member by magnetic force in whatever angular position the two members may happen to be. It is thus seen that the magnet simultaneously fixes the sine bar in its position relatively to the base member and fixes the work piece on the table of the sine bar 13.

The advantages of this arrangement have already been summed up when stating the objects of the invention. The extremely simple manipulation of the tool will, of course, be of the greatest advantage almost in every case. However, especially time and labor can be saved owing to the simplicity of the manipulation where a great number of manipulations has to be performed in rapid succession such as is the case for instance, during checking operations when tapered plug gauges or tapered thread gauges, or countersink gauges have to be checked.

I claim:

1. A sine bar device comprising a base member of magnetically permeable material, provided with a hollow cylindrical surface, covering an arc of less than 180°, a swivel with a cylindrical surface covering an arc of more than 180° of magnetically permeable material, fitting into said hollow cylindrical surface and provided with a central cylindrical opening, a work supporting sine table fixed to said swivel for supporting said work piece, a strip of high magnetic reluctivity arranged radially with respect to the axis of the cylindrical opening within the swivel, bisecting the arcuate portion of the swivel, a further strip of high magnetic reluctivity arranged radially with respect to the axis of the cylindrical opening, bisecting the sine table, and magnetic means, adapted to be made operative and inoperative, for simultaneously producing a magnetic fixation of the swivel on its base and of a work piece on the sine table.

2. A sine bar device comprising a base member of magnetically permeable material, provided with a hollow cylindrical surface, covering an arc of less than 180°, a swivel with a cylindrical surface covering an arc of more than 180° of magnetically permeable material, fitting into said hollow cylindrical surface provided with a hollow cylindrical opening, a work supporting sine table fixedly attached to said swivel, a flux directing strip of a material of high magnetic reluctivity arranged in a radial plane passing through the axis of the swivel and inserted between said cylindrical opening and the outer arcuate cylindrical surface of the swivel, bisecting said arcuate surface, a further strip arranged in the same radial plane in the sine table, bisecting said table in a transverse direction and a rotatable transversely magnetized permanent magnet arranged within the cylindrical central swivel opening for simultaneous magnetic holding action and fixation of the swivel on the base and of the work piece on sine table.

3. A sine bar device comprising a base member of magnetically permeable material, provided with a hollow cylindrical surface, covering an arc of less than 180°, a swivel with a central cylindrical opening and an outer cylindrical surface covering an arc of more than 180° of magnetically permeable material, fitting into said hollow cylindrical surface of the base, a work supporting sine table fixed to said swivel and arranged tangentially to the central cylindrical opening of the swivel, a substantially cylindrical magnet with flattened sides rotatably arranged within said central opening of the swivel, and transversely magnetized, means to rotate said magnet, a flux directing strip of a material of high magnetic reluctivity arranged in a radial plane passing through the axis of the swivel, and inserted between the central opening, housing the permanent magnet and the outer cylindrical surface, completely bisecting the swivel approximately in the middle of the arcuate surface, a further strip of a material of high magnetic reluctivity arranged in the same radial plane with the first named strip, arranged in the sine table at the point at which the latter is tangential to the cylindrical opening, bisecting the sine table transversely, said permanent magnet being thus adapated for double simultaneous action on said swivel and base and on said sine table and work piece.

4. A sine bar device comprising a base member, a cylindrical swivel, adapted to turn on said base member around a center, and provided with a central opening, a work supporting sine table of a material of high permeability fixedly attached to said swivel in close proximity to said central opening, flux directive means for dividing magnetically said sine table into two magnetically separate circuits, flux directive means for dividing magnetically said swivel into two sections, said means including strips of high magnetic reluctivity radiating in opposite directions from the center of the swivel, and magnetic means in the center of the swivel for producing simultaneously a divided magnetic flux in the swivel, joining in the base, and in the sine table, joining in the work.

5. A sine bar device comprising a base member of magnetically permeable material, provided with a hollow cylindrical supporting surface, covering an arc of less than 180°, a swivel and a sine table attached to it, the former consisting of a flattened hollow cylinder provided with a central cylindrical cavity and, with a cylindrical outer surface larger than 180°, the sine table being fixed on the flattened surface of the swivel, and the said cylindrical swivel surface fitting into the hollow cylindrical surface of the base member lateral recesses contiguous to the ends of the cylindrical cavity of the swivel, a transversely magnetized cylindrical permanent magnet with flattened sides within the hollow cylindrical cavity of the swivel, disk shaped plates of non-magnetic material arranged within said lateral recesses, a flux directive dividing strip of non-magnetic material radially bisecting the swivel in the middle of the outer cylindrical surface of the same and dividing it completely into two magnetically separate parts, means for rotating said permanent magnet and for placing its flux emanating flattened sides into different positions with respect to the flux directing strips, a flux directive transversely arranged strip inserted in the radial plane of the aforesaid strip but in a diametrically opposite direction into said sine table, said magnet upon rotation into its operative position producing simultaneously a divided magnetic flux through the swivel and sine table, joined by the base and the work respectively, so as to produce simultaneous fixation of the same, and upon rotation into its inoperative position releasing simultaneously the fixation of the swivel and of the work piece sine table, completely dividing the same into magnetically separate sections, directing the magnetic lines of force into the work piece, placed on said sine table, and means for determining the angular position of the same bar with respect to the base member.

6. A sine bar comprising a swivel extending over an arc of more than 180°, provided with a central cylindrical opening, a sine table fixedly mounted on said swivel, having a work supporting portion extending longitudinally along the swivel and an extension, carrying a sine roller, said swivel and sine table consisting of magnetically permeable material, magnetically non-permeable strips within said swivel and sine table, extending radially from said cylindrical opening, and longitudinally along said swivel, subdividing the arcuate portion of the swivel and the work piece carrying portion of the sine table transversely, a rotatable transversely magnetized substantially cylindrical permanent magnet within the cylindrical opening of the swivel, and means for rotating said magnet within the swivel.

7. A sine bar comprising a cylindrical swivel extending over an arc of more than 180°, provided with a central cylindrical opening, a sine table fixedly mounted on said swivel, substantially tangentially to said central opening of the swivel, said sine table having a work supporting portion extending longitudinally along said swivel and an extension carrying a sine roller at a predetermined distance from the axis of the swivel, said sine table and swivel consisting of magnetically permeable material, a magnetically non-permeable strip extending radially from said central opening substantially in a plane passing through the longitudinal axis of the swivel and bisecting the arcuate portion of the swivel, a magnetically non-permeable strip extending transversely through the work supporting portion of the sine table and extending radially from the said central opening, arranged substantially in the same axial plane with the first mentioned strip, a transversely magnetized substantially cylindrical permanent magnet rotatably fitting into the central cylindrical opening of the swivel and means for rotating said permanent magnet.

8. A sine bar comprising a cylindrical swivel extending over an arc of more than 180°, provided with a central cylindrical opening, a sine table fixedly mounted on said swivel substantially tangentially to said central opening of the swivel, said sine table having a work supporting portion extending longitudinally along said swivel and an extension carrying a sine roller at a predetermined distance from the axis of the swivel, said sine table and swivel consisting of magnetically permeable material, a magnetically non-permeable strip extending radially from said central opening substantially in a plane passing through the longitudinal axis of the swivel and bisecting the arcuate portion of the swivel, a magnetically non-permeable strip extending transversely through the work supporting portion of the sine table and extending radially from the said central opening, arranged substantially in the same axial plane with the first mentioned strip, non-permeable shields for closing the cylindrical opening at both ends of the swivel, openings in said shields, a transversely magnetized substantially permanent magnet arranged between said shields rotatably fitting into the central cylindrical opening of the swivel, stub axles projecting from said magnet and fitting into the shield opening and a handle attached to one of said stub axles for rotating the permanent magnet.

STANLEY SOBILO.

REFERENCES CITED

The following references are of record in the file of this patent:

UNITED STATES PATENTS

| Number | Name | Date |
| --- | --- | --- |
| 1,343,751 | Simmons | June 15, 1920 |
| 1,395,664 | Benson | Nov. 1, 1921 |
| 2,280,437 | Levesque | Apr. 21, 1942 |
| 2,287,286 | Bing | June 23, 1942 |
| 2,333,230 | Beechlyn | Nov. 2, 1943 |
| 2,400,062 | Barrett | May 14, 1946 |